United States Patent [19]
Pongracz et al.

[11] Patent Number: 6,073,128
[45] Date of Patent: Jun. 6, 2000

[54] METHOD AND APPARATUS FOR IDENTIFYING FILES USED TO RESTORE A FILE

[75] Inventors: Gregory Pongracz, Redwood City; Steven Wertheimer, Kentfield; William Bridge, Alameda, all of Calif.

[73] Assignee: Oracle Corporation, Redwood Shores, Calif.

[21] Appl. No.: 08/962,087

[22] Filed: Oct. 31, 1997

[51] Int. Cl.[7] .................................................. G06F 17/30
[52] U.S. Cl. ................................ 707/3; 707/10; 707/102; 707/201; 707/204; 714/6
[58] Field of Search .............................. 707/102, 3, 204, 707/201, 10; 395/200; 714/6

[56] References Cited

U.S. PATENT DOCUMENTS

| | | | |
|---|---|---|---|
| 5,515,502 | 5/1996 | Wood | 395/182.13 |
| 5,608,865 | 3/1997 | Midgely et al. | 395/180 |
| 5,720,026 | 2/1998 | Uemura et al. | 395/182.04 |
| 5,721,916 | 2/1998 | Pardikar | 707/104 |
| 5,751,997 | 5/1998 | Kullick et al. | 395/489 |
| 5,758,359 | 5/1998 | Saxon | 707/204 |
| 5,771,354 | 6/1998 | Crawford | 395/200.59 |
| 5,778,395 | 7/1998 | Whiting et al. | 707/204 |
| 5,790,888 | 8/1998 | Dreyer et al. | 395/825 |
| 5,799,322 | 8/1998 | Mosher | 707/102 |

OTHER PUBLICATIONS

"Microsoft Windows Help", Microsoft SQL Entreprise Manager Online Help, pp. 1–11, Jan. 1990.

*Primary Examiner*—Anton W. Fetting
*Assistant Examiner*—Jean M Corriélus
*Attorney, Agent, or Firm*—Law Offices of Charles E. Gotlieb

[57] ABSTRACT

A method and apparatus identifies backup files that will restore a file in a transactional system. A reset stamp and filename is used to identify all backup files of the file having the filename since the file was last restored. A smaller number of files necessary to restore the file are selected from these backup files by sorting the list of files and selecting certain files in sort order. If necessary, earlier reset stamps are identified and more files are identified and selected, until a file is selected that contains a full backup or datafile copy of the file. For the backup files selected, information such as the location of the file is stored in the order in which the backup files are selected. The information, such as the location of each file selected, is provided in an order that is the reverse of the order in which the files were selected so that the oldest file is listed first. The files may be restored in the order provided.

29 Claims, 4 Drawing Sheets

METHOD AND APPARATUS FOR IDENTIFYING FILES USED TO RESTORE A FILE

RELATED APPLICATIONS

The subject matter of this application is related to the subject matter of pending application Ser. No. 08/962,539 entitled, "METHOD AND APPARATUS FOR RESTORING A PORTION OF A DATABASE" filed on Oct. 31, 1997 by C. Gregory Doherty, Gregory Pongracz, William Bridge, Juan Loaiza and Mark Ramacher, pending application Ser. No. 08/962,086 entitled, "METHOD AND APPARATUS FOR EFFICIENTLY BACKING UP FILES USING MULTIPLE COMPUTER SYSTEMS" filed on Oct. 31, 1997 by Gregory Pongracz, Steven Wertheimer and William Bridge, pending application Ser. No. 08/961,747 entitled, "METHOD AND APPARATUS FOR PRESERVING NON-CURRENT INFORMATION THAT CAN BE OVERWRITTEN IN A COMPUTER FILE" filed on Oct. 31, 1997 by Gregory Pongracz and Tuomas Pystynen, pending application Ser. No. 08/961,741 entitled, "METHOD AND APPARATUS FOR ACCESSING A FILE THAT CAN BE CONCURRENTLY WRITTEN" filed on Oct. 31, 1997 by Tuomas Pystynen and Gregory Pongracz, each having the same assignee as this application and incorporated herein by reference in its entirety.

FIELD OF THE INVENTION

The present invention is related to backup and restoration of computer files and more specifically to the identification of files used to restore computer files.

BACKGROUND OF THE INVENTION

Many computer files are stored on devices such as conventional hard disk drives. Because such devices can fail, resulting in the loss of some or all of the data they contain, many users make copies of their computer files on the same or different types of devices. Such copies of files are commonly referred to as "backup files" or "backups". Two commonly used devices on which users store backup files are tape drives and disk drives.

There are several types of backup files employed to duplicate files used by a transactional system such as a database system. "Full backup" files are used to copy an entire file on to a tape. If the copy is made to a disk drive, the file is called a "datafile copy". "Incremental backup" files store data that has changed since a last backup file was made. Two types of incremental backups may be employed. A "standard incremental backup" backs up data from the most recent full backup, datafile copy or the most recent incremental backup. A "cumulative incremental backup" stores data that has changed since the last full backup or datafile copy. For example, if a full backup is made on Sunday, an incremental backup is made on Monday, a standard incremental backup made on Tuesday will contain the changes made since the incremental backup on Monday; however a cumulative incremental backup made on Tuesday will contain all changes made since the full backup on Sunday.

Two other types of files exist which are related to backup files. An "offline range" identifies a period of time during which a file is guaranteed not to have changed. A file that is configured as "read-only" is such a file. The existence of an offline range allows a user to skip making some or all scheduled back ups during the period identified by the offline range without losing integrity of the backup files. An "online range" is the opposite of an offline range, containing periods during which the file may have been changed, with other periods being offline ranges by inference. The offline periods inferred by the online range may be used like offline ranges. Although offline ranges and online ranges are not technically backup files, as used herein, the term, "backup files", includes offline ranges, online ranges and offline periods inferred from online ranges.

If a file becomes damaged or corrupt, restoration of the file using conventional methods is performed using the steps described herein. First, the most recent full backup or datafile copy is restored, then, incremental backups are applied to the restored full backup or datafile copy to bring the file a as near as possible to the desired point in time during which the file was known to be good. If the incremental backups are insufficient to restore the file to the desired point in time, transaction logs, which record each transaction applied to the file by the transactional system, may be applied from the time of the most recent incremental backup to the desired point in time.

The restoration of transactional files can pose special problems. A file may be backed up on Sunday, Monday and Tuesday as described above. However, on Tuesday after the incremental backup, the file may be found to be corrupted. The user may determine that the file was in good condition through the Monday backup, but not further. The file may be restored using the backups of Sunday and Monday and the transactional system restarted using this restored file. This is called an "incomplete recovery." Assume on Wednesday, the file is backed up using a standard incremental backup and on Thursday, the file is determined to be corrupt again after the Wednesday backup file was made. To properly restore the file to the point in time of the Wednesday backup file, it is necessary to use the Sunday, Monday, and Wednesday backups, but it is also necessary to omit restoring the Tuesday backup file containing the corrupt information.

In a transactional system, certain information is provided to assist the person performing the restoration of the files in this endeavor. In addition to identifying the backup files with the file name of the file, some conventional transactional systems maintain additional information about each backup file to allow the party restoring the file to identify the proper file to restore. This information may make use of a transaction counter or similar identifier. Some conventional transactional systems such as the Oracle 8 database product commercially available from Oracle Corporation of Redwood Shores, Calif. maintain a transaction counter, which counts transactions performed by the system. When a database is created, the transaction counter is set to zero, and incremented by one or more for each transaction performed. A pair of identifiers known as a "From-SCN" and "To-SCN" record the state of the transaction counter at a starting point and ending point, and delimit the time period covered by the backup. In addition, when a database is created or undergoes incomplete recovery, the database is assigned a new reset stamp, a unique identifier created by coupling the current value of the transaction counter with the an integer representation of the current system date and time. Each file opened with write access for use by the database is marked with the reset stamp of the database. Thus, in the example above, when created, the Sunday, Monday and Tuesday backups would have the same reset stamp. When the Tuesday backup was restored and opened for write access, the database would be assigned a new reset stamp using the state of the transaction counter at the time the database was incompletely recovered on Tuesday and the database would write the reset stamp into the restored copy of the Tuesday backup. The Wednesday backup would have this same reset stamp. The reset stamp of the Wednesday backup files, being different from the other archived backup files, would alert the person performing the restoration of the backup files that the file had been restored earlier, and the value of the reset stamp of the Wednesday backup files would identify the Tuesday archived backup as having been superseded.

In some transactional systems, such as the Oracle8 product, a separate data base table is maintained for each type of backup file. In one embodiment, each table contains one record per backup file of the type stored by the table. Each record contains the name of the file, the location of the backup file, the To-SCN, the From-SCN and the reset stamp of the backup file. This information may be used by the party restoring the database files to allow the party to properly restore the database file. In addition, a linked list of reset stamps is maintained in a file to allow a user to identify the sequence of reset stamps generated for a file. Nevertheless, because some files must be omitted from restoration as described above, identifying the proper files to restore has remained a tedious, error-prone task.

In addition to the problem of the correct identification of backup files, because both standard incremental backup files as well as cumulative incremental backup files may exist, identifying all the files with the proper reset stamps and SCNs may mean that the operator restoring the files may restore a standard incremental backup file containing information that is or will be restored from the cumulative backup. The duplication is not harmful to the file, because information already restored is simply overwritten with the same information. However, because each backup file must be located, and the tape containing the file mounted, searched and read, restoration of information already restored wastes time and resources.

Therefore, there is a need for a system and method for restoring backup files that identifies the proper backup file or files to be used and reduces the number of backup files used to restore a file.

SUMMARY OF INVENTION

A method and apparatus receives a file name and reset stamp of a file and builds a list of backup file records of all types of backup files corresponding to the file name and reset stamp received. The list of backup file records is then scanned to identify the files to restore. Starting with one file record, the list is scanned and file records identified in reverse chronological order until a full backup or datafile copy is identified. To assist in this operation, the list may be sorted in reverse chronological order by sorting the list based on descending "To-SCN", breaking ties in favor of the lowest From-SCN, and breaking ties between datafile copies and full backups in favor of datafile copies. The sort allows the list to be scanned from top to bottom identifying the first file located that has a From-SCN less than the prior identified file. The file records so identified may be stored in a restore list stack, which can be popped to provide the list of files to restore. If the list is exhausted without locating a full backup or datafile copy, the reset stamp prior to the reset stamp received is identified, and the steps described above are repeated using the reset stamp identified. The method and apparatus allows the identification of backup files to be automated, allowing higher accuracy in the identification of backup files. Additionally, the method and apparatus will identify fewer files to restore if cumulative incremental backups duplicate information contained in one or more incremental backups.

DETAILED DESCRIPTION OF A PREFERRED EMBODIMENT

Figure 1:
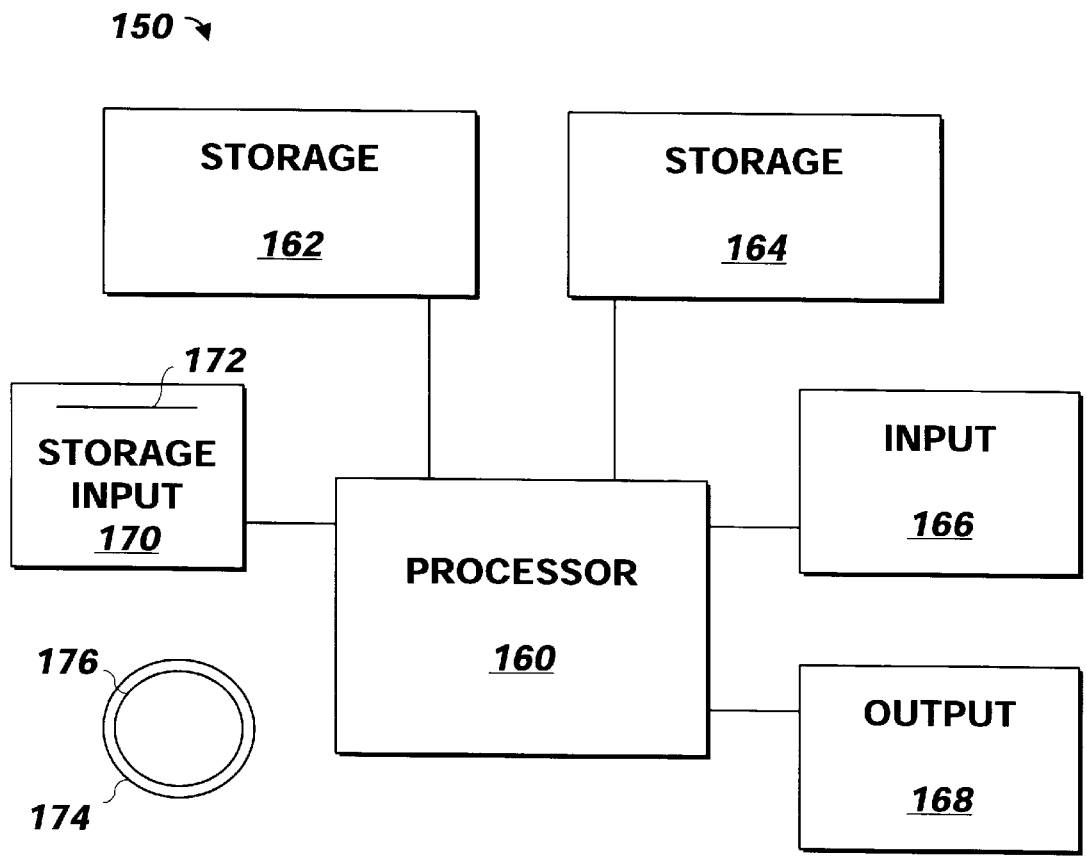
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Figure 2:
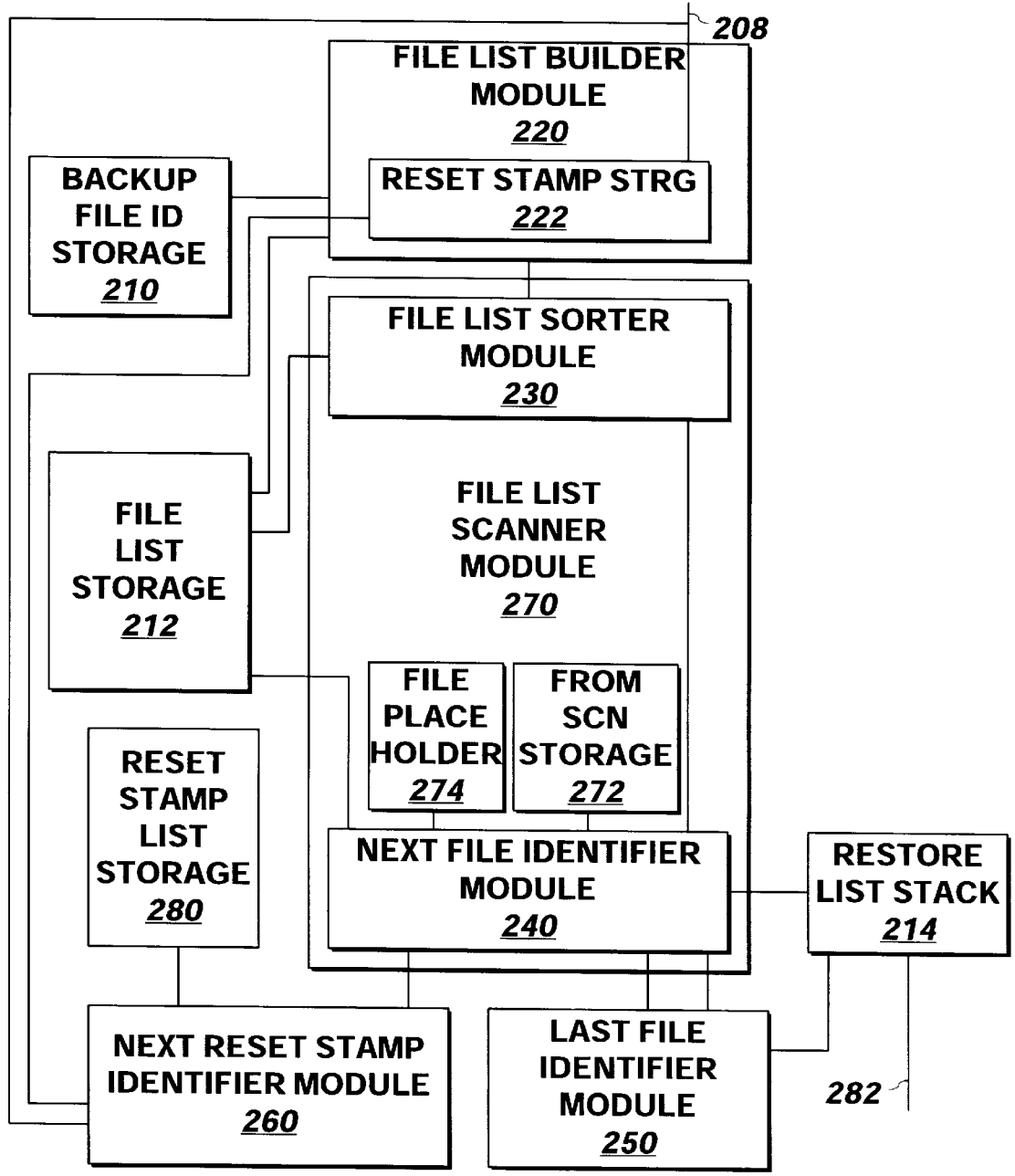
FIG. 2 is a block schematic diagram of an apparatus for identifying backup files used to restore a file according to one embodiment of the present invention.

Referring now to FIG. 2, a system for identifying files to restore is shown according to one embodiment of the present invention. Backup file ID storage 210 stores file records for each backup file that are produced by the transactional system such as the Oracle 8 data base product commercially available from Oracle Corporation of Redwood Shores, Calif. Each file record describes one backup file, and each file record contains one or more identifiers of the file name, reset stamp, From-SCN, To-SCN and location for each backup file. The location of a file may include a media identifier such as "tape number 11253" and may also include a physical location like "computer room" or "off-site storage". In one embodiment, backup file ID storage 210 is a conventional database with one table for each type of backup file: full backup, datafile copy, incremental backup and offline range.

File list builder module 220 receives at input 208 the name of the file to be restored and the latest reset stamp value of the file the user desires to restore. File list builder module 220 stores the reset stamp in reset stamp storage 222 and stores the filename. Additionally, file list builder module 220 builds in file list storage 212 coupled to file list builder module 220 all of the backup file records stored in the backup file ID storage 210 corresponding to the file name and a reset stamp received. In addition, file list builder module 220 identifies datafile copies by adding a type value field of '1' to file records corresponding to datafile copies, a type value of '2' to file records corresponding to full backups and a type value of '3' to file records corresponding to all other types of files, although more detail may be provided using other values of the type value field in other embodiments. In one embodiment, backup file ID storage 210 is a conventional database and file list builder module 220 builds a query and sends it to backup file ID storage 210 to perform the tasks described above.

In one embodiment, file list builder module 220 receives via input 208 certain identifiers that are to cause file list builder module 220 to ignore some of the records in backup file storage 210. For example, file records may contain location fields containing an identifier of the location of the backup file. If the user is in a hurry to restore a file, the user may enter via input 208 the locations of offsite storage and instruct the file list builder module to ignore file records with fields containing identifiers of offsite locations. File list builder module 220 would omit such records from the file list it places into file list storage 212. In an alternative embodiment, file list builder module 220 receives certain identifiers and includes only records with matching fields in the file list storage 212. An still another embodiment, file list builder module 220 includes only records matching some of the identifiers received at input 208, but omits records matching other identifiers received at input 208.

File list storage 212 stores some or all of the file records supplied by file list builder module 220. In another embodiment, the file records in backup file ID storage 210 are marked as identified by file list builder module 220, for example using a field in the record holding the file identifiers, and file list storage 212 contains only this field.

Figure 3:
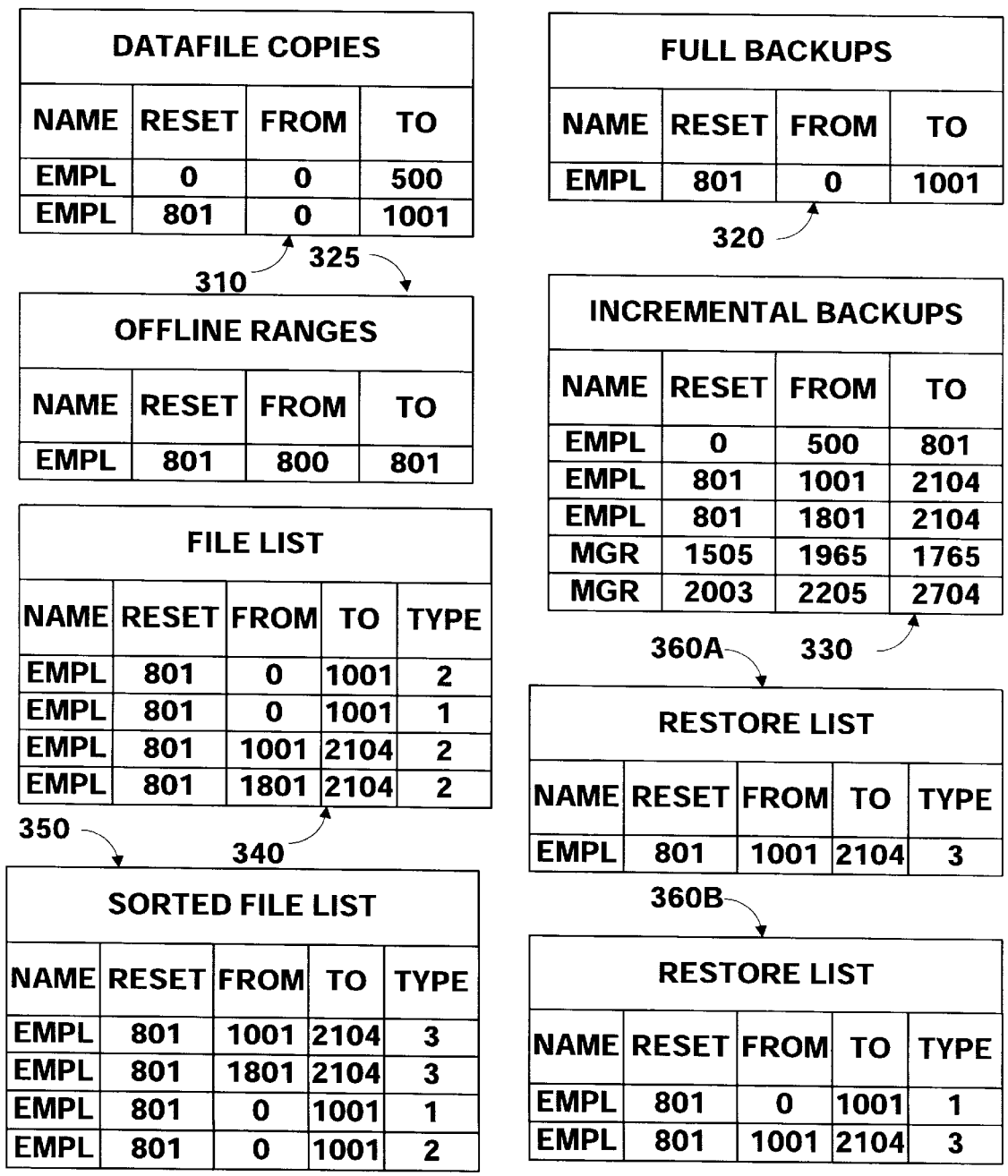
FIG. 3 is a block diagram of tables of example file records received and the tables generated in the operation of the present invention according to one embodiment of the present invention.

Referring now to FIGS. 2 and 3, tables 310, 320, 325, 330 are examples of tables that might be stored in backup file ID storage 210 (the details about the locations and other identifiers of the files in each file record that might be listed in tables 310, 320, 325, 330 have been omitted to avoid cluttering FIG. 3). File list builder module 220 would build the file list in table 340 if the filename "Empl" and reset stamp "801" were entered at input 208.

Referring again to FIG. 2, when file list builder module 220 completes building the file list as described above, file list builder module 220 signals file list scanner module 270 coupled to file list builder module 220. As described in more detail below, file list scanner module 270 scans the file list of file records stored in, or indicated by, file list storage 212 to identify the backup files required to restore the file. In the process of identifying the backup files, file list scanner module 270 omits standard incremental backups that duplicate information which can be restored via a cumulative backup, and omits smaller cumulative incremental backups that are duplicated by a larger cumulative incremental backup. File list scanner module 270 identifies some or a portion of each of the records of these files in reverse chronological order and identifies these records as being in restore list stack 214 coupled to file list scanner module 270. The identification of records being in restore list stack 214 involves copying some or all of each record identified by file list scanner module 270 into restore list stack 214 in one embodiment. In another embodiment, the identification of records being in restore list stack 214 involves designating whether the file record is in the restore list, and the order in which it was placed there, using a field in each file record, and restore list stack 214 stores this field. In one embodiment, file list scanner module 270 performs these functions using a file list sorter module 230 and next file identifier module 240 described below.

File list sorter module 230 receives the signal from file list builder module and sorts the file records in a file list storage 212 as follows: file records are sorted descending from highest To-SCN. Ties are broken in favor of the lowest From-SCN first, which will cause records corresponding to the largest cumulative incremental backup to be listed ahead of records corresponding to smaller cumulative backups and standard incremental backups duplicating information in the largest cumulative backup. Ties between datafile copies and full backups are resolved in favor of the datafile copies. File list sorter module 230 signals next file identifier module 240 when file list sorter module 230 has completed the sort described above. Referring momentarily to FIG. 3, table 350 shows table 340 sorted as described above by file list sorter module 230.

Referring again to FIG. 2, next file identifier module 240 selects file records from among those stored in, or indicated by, file list storage 212 and pushes them onto the restore list stack 214. In one embodiment, the restore list stack 214 is a storage area of memory or disk which stores some or all of each file record received like a conventional stack. Next file identifier module 240 selects a file record from file list storage 212 using the procedure described below.

For the first file to be selected from a file list in file list storage 212, the file list placeholder 274 is initialized by next file identifier module 240 to point to the first record at the top file list storage 212. Next file identifier module 240 selects the file record at the top of file list storage 212 and pushes some or all of the record onto restore list stack 214. Next file identifier module 240 stores the From-SCN of this file record in From-SCN storage 272. The type identifier of the file record is sent by next file identifier module 240 to last file identifier module 250 which identifies whether the file is a full backup or datafile copy. If the file selected by next file identifier module 240 is a full backup or datafile copy, last file identifier module 250 signals restore list stack 214, which pops the identifiers of the files in the file records in restore list stack 214 in LIFO order to output 282. The identifiers of these files can include the filename and location of the file, which may be used to restore the file using any conventional restore technique.

If last file identifier module 250 does not identify the file type as a full backup or datafile copy, last file identifier module 250 signals next file identifier module 240 to identify the next file record.

Referring now to FIGS. 2 and 3, the example described above will be continued. Table 360A shows the state of the restore list in restore list stack 214 after next file identifier module 240 pushes the first row from the sorted file list 350 onto it 214. The file has a type value of '3', signifying that it is neither a datafile copy nor a full backup. Last file identifier module 250 signals next file identifier module 240 to identify the next file. Last file identifier module 250 does not signal restore list stack 214, which therefore holds the record.

Referring again to FIG. 2, to identify the next file record, next file identifier module 250 scans the file records in file list storage 212 to identify the next backup file. Scanning in sort order beginning with the file identifier below the file record pointed to by file list placeholder 274, next file identifier module 270 identifies the first file in the file list storage 212 that meets the next file criteria. The next file criteria is satisfied by the first file identified in the sorted list in file list storage 212 that has a lower From-SCN than the From-SCN stored in From-SCN Storage 272. If such a file exists, it becomes the next file record identified. Next file identifier module 240 pushes some or all of the file record onto restore list stack 214, stores the From-SCN of this file into From-SCN storage 272, and updates the file placeholder 274 to point to the record identified. Next file identifier module 240 sends the type of this next file identified to last file identifier module 250 to identify whether the file identified is a datafile copy or full backup. Last file identifier module 250 signals restore list stack 214 or next file identifier module 240 as described above. In one embodiment, the file list storage 212 is a conventional database table and the function of file list placeholder 274 is performed by file list storage 212.

Referring now to FIGS. 2 and 3, to continue the prior example, file list placeholder 274 holds the value of the From-SCN of the file record in restore list 360A. Next file identifier module 240 scans the file list storage 350 for the next file. The file record under the prior file that meets the next file criteria is in the third row of table 350, and next file identifier module 240 pushes that row onto the restore list stack 214, as shown in table 360B. Next file identifier module 240 sends the file type of the record selected to last file identifier module 250. Last file identifier module 250 uses the file type to identify the file as a datafile copy, and signals restore list stack 280 to pop, in LIFO order, the restore list it stores, providing the party who will restore the files with a list of files to restore. (As described above, the locations and other identifiers that would be used to identify the file to restore are not shown in the Figure, but would be a part of each record in table 360B).

Although the example above demonstrated next file identifier 240 identifying only two file records, the apparatus of the present invention can identify larger numbers of file records. If the second file is not a full backup or datafile copy, next file identifier module 240 continues to identify a next file record as described above when signaled by last file identifier module 250 until no more file records exist in file list storage 212 or the file record identified by next file identifier module 240 is identified by last file identifier module 250 as having a type identifier of a datafile copy or full backup.

If the file record identified by next file identifier module 270 has a To-SCN that is lower than the From-SCN stored in From-SCN storage 272, a gap exists in the backup files. A gap means that no backup files exist that cover an SCN range between the To-SCN of the file selected and the From-SCN stored in From-SCN storage 272. In such a situation, in one embodiment, next file identifier module 240 purges restore list stack 214 deleting all records of files backed up after the gap. The record identified by next file identifier module 240 is the record of the first backup file backed up prior to this gap. Next file identifier module 240 pushes this record onto the restore list stack 214 as the first file, and sends the type identifier of the record to last file identifier module 250, as described above, and the system operates as described above, as if this file record were the first file record. For example, if signaled by last file identifier module 250, next file identifier module 240 selects the next file from file list storage 212 meeting the next file criteria as described above. In such embodiment, the list of files to restore contained in restore list stack 214 will contain only records of backup files that were backed up before any such gap. Transaction logs may then be used to complete the restoration of the file from the start of the gap to the desired point in time of the restoration.

In another embodiment, if next file identifier module 240 identifies a gap, next file identifier module 240 builds a file record that describes the gap between the From-SCN stored in From-SCN storage 272 and the To-SCN of the file selected, and designates the identifier as a gap. Next file identifier module 240 pushes this record onto the restore list stack 214, then pushes the file record it selected from file list storage 212 onto the restore list stack 240. The existence in the restore list stack 214 of the file record containing the gap will signal the party restoring the files that transaction logs must be used to fill the gap during the restoration of the file.

If next file identifier module 240 reaches of the bottom of file list storage 212 and no full backup or datafile copy is identified, backup files with an earlier reset stamp may be used to complete the list of files to restore. Next file identifier module 240 passes the reset stamp from the file record last identified to next reset stamp identifier module 260. Next reset stamp identifier module 260 identifies the prior reset stamp of the file using a linked list of reset stamps contained in reset stamp list storage 280. Next reset stamp identifier module 260 passes the prior reset stamp to file list builder module 220, which stores the reset stamp in reset stamp storage 222, and, using the new reset stamp and the filename entered by the user, builds a new file list in file list storage 212. The apparatus selects the first file in the list as described above and continues to operate as described above until a datafile copy or full backup is identified, or there are no more backup file records.

Figure 4:
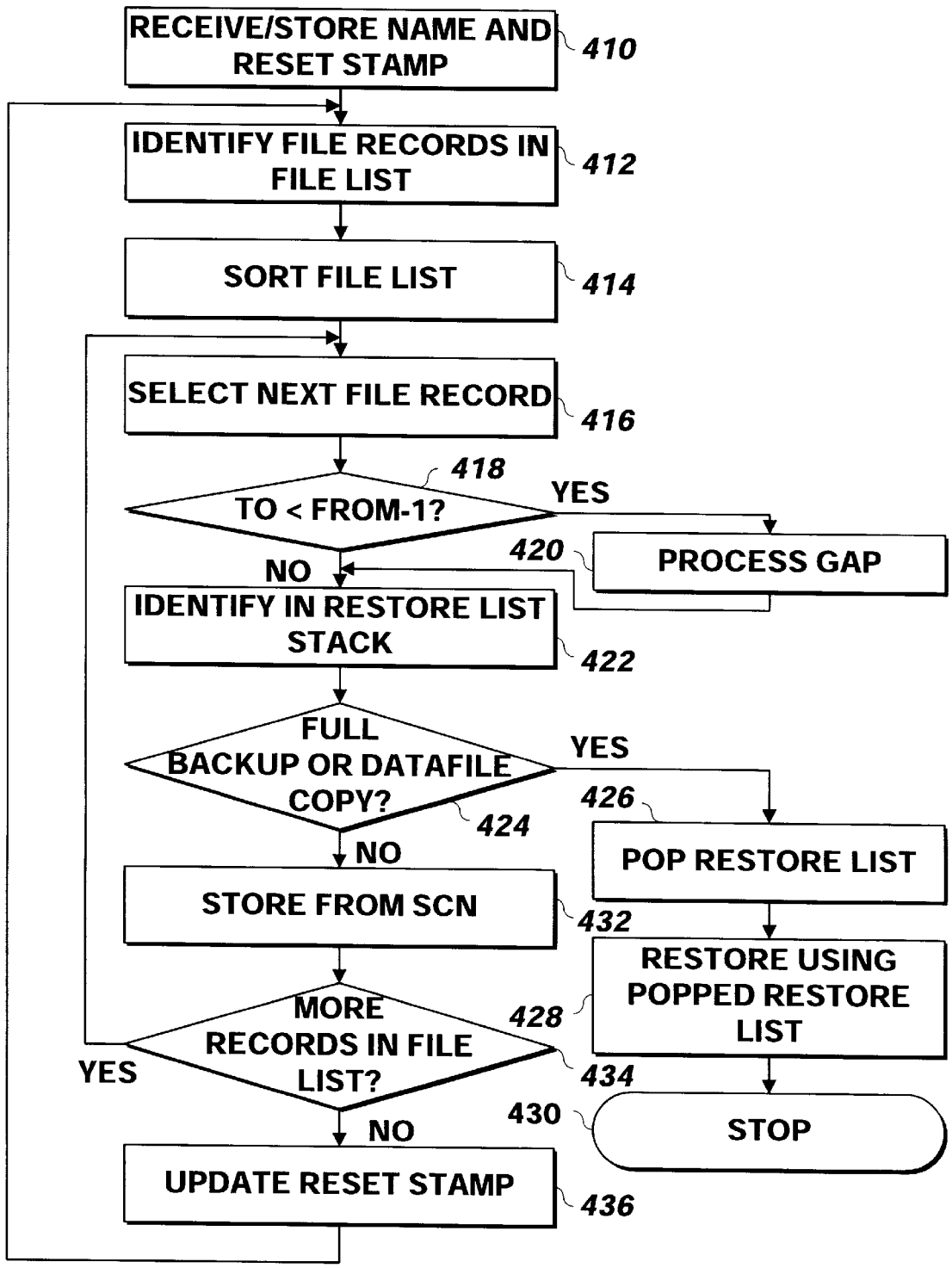
FIG. 4 is a flowchart illustrating a method of identifying backup files used to restore a file according to one embodiment of the present invention.

Referring now to FIG. 4, a method of identifying backup files according to one embodiment of the present invention is shown. A reset stamp and filename are received and stored 410. The file name is the name or other identifier of the file to be restored from backups, and the reset stamp is the most current reset stamp of last backup file of the file to be restored.

File records having any name and reset stamp matching the name and reset stamp received in step 410 are identified 412, for example from a larger group of file records, as being in a file list. In one embodiment, each file record contains information such as the name and location of a backup file, as well as the reset stamp of the file and To- and From-SCNs of that backup file. In one embodiment, some of this information is omitted from the file records because it can be inferred, such as the From-SCN of a full backup being 0. In one embodiment, these matching file records are identified by copying them into a separate file list. In another embodiment, these matching file records are marked as being in the file list, and the records remain in their original locations. In one embodiment, in step 412, inferred information is identified and made explicit in each record. In one embodiment, a certain records are omitted or included based on other identifiers received a in step 410 as described above.

The file list is sorted as described above 414. In one embodiment, the file list is sorted by rearranging the order of the records in the file list, and in another embodiment, each record is assigned a numeric logical sort order without physically moving the records.

A next file record is selected 416 from the sorted file list as described above. During the first such selection from the file list, the file record selected is at the top of the sorted file list in one embodiment. In another embodiment, step 410 also includes receiving a To-SCN, and the first such selection is the file record with the highest sort order that has a To-SCN below the To-SCN received in step 410.

The To-SCN of the file selected in step 420 is compared with the From-SCN stored in step 432 described below. The first time step 418 is executed for a file list, no From-SCN is stored, or a From-SCN value is initialized as 0, and step 418 results in the "no" branch being taken, and the method continues at step 422. If step 418 is executed subsequently, for example, in a later iteration, the comparison of step 418 serves to identify gaps in the backup files described above. If such a gap is identified, the gap is processed 420, either by generating a record describing the gap in one embodiment, or by purging the backup list in another embodiment, both as described above.

The record selected in step 416 is identified 422 in a restore list stack. In one embodiment, the identification is made by copying the record from the file list into a restore list stack storage area as described above. In another embodiment, the identification in step 422 is made by marking the record in the file list as belonging in the restore list stack and optionally indicating the order in which the file was identified as being in the restore list stack.

The file selected in step 416 is checked 424 to determine if the file is a full backup or datafile copy. In one embodiment, such file records are marked for such determination in step 412 as described above. If the file is a full backup or datafile copy, the restore list stack is popped 426, in LIFO order in one embodiment, or in FIFO order in another embodiment, and the files corresponding to the records in the restore list stack are restored 428, and the method terminates 430.

If the file selected in step 416 is not a full backup or datafile copy, the From-SCN from the record selected in step 416 is stored 432. The file list is checked 434 to identify whether additional file records exist that contain a From-SCN lower than the From-SCN of the file stored in step 432. If more such file records exist, the method continues at step 416.

If no such additional file records exist, the reset stamp stored in step 410 is updated 436 by identifying the reset stamp of the file having the name received in a step 410 that is prior to the reset stamp stored in step 410 or an earlier iteration of step 436, and storing the reset stamp identified in place of that reset stamp. The method continues at step 412 using the updated reset stamp identified in step 436.

What is claimed is:

1. An apparatus for identifying at an output a plurality of files to restore, comprising:
    a file list builder module having a first input operatively coupled for receiving a plurality of sets of information corresponding to backup files, a second input operatively coupled for receiving at least one first identifier corresponding to a plurality of files comprising a most recent backup file, the file list builder module for automatically identifying at an output at least one of the sets of information corresponding to the at least one first identifier; and
    a file list scanner module having an input coupled to the file list builder module output, the file list scanner module for identifying and providing at a first output coupled to the apparatus output less than all of the sets of information received at the file list scanner module input.

2. The apparatus of claim 1 wherein the file list scanner identifies the sets of information in reverse chronological order.

3. The apparatus of claim 1, additionally comprising:
    a first addressable storage coupled between the file list builder module output and the file list sorter module input for storing the sets of information received at an input coupled to the file list builder module output and providing at least one of the sets of information at an output coupled to the file list scanner module input; and
    wherein:
    each of the sets of information stored in the file list storage comprise a second identifier; and
    the file list scanner module comprises:
        a first file list scanner module storage having an input/output, for storing and providing at the input/output a third identifier received at the input/output; and
        a next file identifier module having an input coupled to the file list scanner module input and an input/output coupled to the first file list scanner module storage input/output, for selecting and providing at a first output coupled to the file list scanner module output at least a portion of one of the sets of information having a second identifier less than the third identifier.

4. The apparatus of claim 3, wherein the next file identifier module comprises:
    list scanner module, and the next file identifier module is additionally for providing at the next file identifier module second output a type indicator of each of the sets of information provided at the next file identifier module first output;
    a second input coupled to a file list scanner module second input operatively coupled to receive a signal having a first state and a second state; and
    wherein the next file identifier module selects and provides a set of information responsive to the signal received at the second next file identifier module input in the first state; and
    the apparatus additionally comprises a last file identifier module having an input coupled to the file list scanner module second output, for providing at a first output coupled to the next file identifier module second input the signal responsive to the type identifier received at the last file identifier module input.

5. The apparatus of claim 4 wherein:
    the file list scanner module additionally comprises a file list sorter module coupled to the file list storage for sorting the sets of identifiers in the file list storage in an order of a fourth identifier and breaking ties in an order of the second identifier.

6. The apparatus of claim 5 wherein the file list sorter module additionally breaks ties in favor of a type identifier corresponding to a datafile copy.

7. The apparatus of claim 6, additionally comprising:
    a restore list stack having a first input coupled to the next file identifier module first output for receiving and storing at least one of the portions of the sets of information, and a second input coupled to the last file identifier module first output, the restore list stack for providing at an output coupled to the apparatus output a plurality of the portions of the sets of information stored.

8. The apparatus of claim 7 additionally comprising:
    a next reset stamp identifier module having a first input operatively coupled to receive the first identifier, the next reset stamp identifier module for selecting a fifth identifier from a plurality of identifiers, the fifth identifier corresponding to at least one file stored before the at least one file corresponding to the first identifier, the next reset stamp identifier module additionally for providing to an output coupled to the file list builder module second input the fifth identifier.

9. The apparatus of claim 8 wherein the next file identifier module is additionally for comparing the fourth identifier of the set of information it selects with the third identifier stored in the input/output and for generating and providing at the first input/output a set of information responsive to the fourth identifier less than one less than the third identifier.

10. A method of identifying at least one backup file to restore, each file having a record, comprising:

receiving at least one first identifier corresponding to a first plurality of backup files comprising at least one file not containing errors; and identifying the records of the first plurality of backup files corresponding to the at least one first identifier received from records of a second plurality of backup files comprising the first plurality of backup files and at least one additional backup file responsive to the receiving step.

11. The method of claim 10 wherein the identifying step is performed in a reverse chronological order indicated by the file records.

12. The method of claim 10, wherein each of the file records comprise a second identifier and a third identifier, and the identifying step comprises:

selecting a first file record;

comparing the second identifier of a first file record with the second identifier of a second file record;

comparing the third identifier of the first file record with the second identifier of the second file record; and identifying the first file responsive to:
the second identifier of the first file having a value less than a value of the second identifier of the second file; and
a value of the third identifier of the first file not less than one less than the second identifier of the second file record.

13. The method of claim 12 wherein the identifying step additionally comprises comparing the value of the second identifier of the first file with a value of the second identifier of a third file; and the identifying the first file is additionally responsive to the value of the second identifier of the first file not greater than the value of the second identifier of the third file.

14. The method of claim 12 wherein:

at least a plurality of each of the file records identified comprise a type having a first state and a second state;

the identifying step additionally comprises comparing the type of a second file record with the type of a third file record; and the identifying the first file is additionally responsive to the type of the first file matching a value.

15. The method of claim 14 wherein the value corresponds to a value of a datafile copy.

16. The method of claim 12 wherein the identifying step additionally comprises:

designating the first file as the second file;

selecting another file as the first file; and repeating the comparing steps and the identifying the first file step.

17. The method of claim 12 wherein the selecting the first file record step comprises:

selecting a first file;

comparing a value of the third identifier of the first file with a value of the first identifier of a second file; and responsive to the value of the third identifier of the first file lower than one less than the value of the second identifier of the second file, generating a file record responsive to the third identifier of the first file and the second identifier of the second file.

18. The method of claim 10, comprising the additional steps of:

storing at least a portion of a plurality of the records identified in a first order; and transmitting at least a portion of a plurality of the records stored in a second order different from the first order.

19. The method of claim 10, comprising the additional steps of:

receiving a fourth identifier corresponding to a third plurality of backup files; and identifying in reverse chronological order records of the third plurality of backup files from records of a fourth plurality of backup files comprising the third plurality of backup files and at least one additional backup file.

20. A computer program product comprising a computer useable medium having computer readable program code embodied therein for identifying a plurality of backup files to restore, each such file having a record, the computer program product comprising:

computer readable program code devices configured to cause a computer to receive at least one first identifier corresponding to a first plurality of backup files comprising at least one file not containing errors; and computer readable program code devices configured to cause a computer to identify the records of the first plurality of backup files corresponding to the at least one first identifier received from records of a second plurality of backup files comprising the first plurality of backup files and at least one additional backup file responsive to receipt of the at least one first identifier.

21. The computer program product of claim 20 wherein the computer readable program code devices configured to cause a computer to identify comprise computer readable program code devices configured to cause a computer to identify the records of the first plurality of backup file in a reverse chronological order indicated by the file records.

22. The computer program product of claim 20, wherein each of the file records comprise a second identifier and a third identifier, and the computer readable program code devices configured to cause a computer to identify comprise:

computer readable program code devices configured to cause a computer to select a first file record;

computer readable program code devices configured to cause a computer to compare the second identifier of a first file record with the second identifier of a second file record;

computer readable program code devices configured to cause a computer to compare the third identifier of the first file record with the second identifier of the second file record; and computer readable program code devices configured to cause a computer to identify the first file responsive to:
the second identifier of the first file having a value less than a value of the second identifier of the second file; and a value of the third identifier of the first file not less than one less than the second identifier of the second file record.

23. The computer program product of claim 22 wherein the computer readable program code devices configured to cause a computer to identify additionally comprise computer readable program code devices configured to cause a computer to compare the value of the second identifier of the first file with a value of the second identifier of a third file; and the computer readable program code devices configured to cause a computer to identify the first file are additionally responsive to the value of the second identifier of the first file not greater than the value of the second identifier of the third file.

24. The computer program product of claim 22 wherein:

at least a plurality of each of the file records identified comprise a type having a first state and a second state;

the computer readable program code devices configured to cause a computer to identify additionally comprises computer readable program code devices configured to cause a computer to compare the type of a second file record with the type of a third file record; and the computer readable program code devices configured to cause a computer to identify the first file are additionally responsive to the type of the first file matching a value.

25. The computer program product of claim 24 wherein the value corresponds to a value of a datafile copy.

26. The computer program product of claim 22 wherein the computer readable program code devices configured to cause a computer to identify additionally comprise:

computer readable program code devices configured to cause a computer to designate the first file as the second file;

computer readable program code devices configured to cause a computer to select another file as the first file; and computer readable program code devices configured to cause a computer to repeat the comparing steps and the identifying the first file step.

27. The computer program product of claim 22 wherein the computer readable program code devices configured to cause a computer to select the first file record comprise:

computer readable program code devices configured to cause a computer to select a first file;

computer readable program code devices configured to cause a computer to compare a value of the third identifier of the first file with a value of the first identifier of a second file; and computer readable program code devices configured to cause a computer to, responsive to the value of the third identifier of the first file lower than one less than the value of the second identifier of the second file, generate a file record responsive to the third identifier of the first file and the second identifier of the second file.

28. The computer program product of claim 20, additionally comprising:

computer readable program code devices configured to cause a computer to store at least a portion of a plurality of the records identified in a first order; and computer readable program code devices configured to cause a computer to transmit at least a portion of a plurality of the records stored in a second order different from the first order.

29. The computer program product of claim 20, additionally comprising:

computer readable program code devices configured to cause a computer to receive a fourth identifier corresponding to a third plurality of backup files; and computer readable program code devices configured to cause a computer to identify in reverse chronological order records of the third plurality of backup files from records of a fourth plurality of backup files comprising the third plurality of backup files and at least one additional backup file.

* * * * *